(12) United States Patent
Wang et al.

(10) Patent No.: US 10,476,701 B2
(45) Date of Patent: Nov. 12, 2019

(54) METHOD FOR HIGH-SECURITY DATA TRANSMISSION OF BLOCKCHAIN

(71) Applicant: NATIONAL CHIAO TUNG UNIVERSITY, Hsinchu (TW)

(72) Inventors: Li Chun Wang, Hsinchu (TW); Yu-Jia Chen, Kaohsiung (TW); Shu Wang, Beijing (CN)

(73) Assignee: National Chiao Tung University, Hsinchu (TW)

( * ) Notice: Subject to any disclaimer, the term of this patent is extended or adjusted under 35 U.S.C. 154(b) by 65 days.

(21) Appl. No.: 15/928,458

(22) Filed: Mar. 22, 2018

(65) Prior Publication Data

US 2019/0158313 A1    May 23, 2019

(30) Foreign Application Priority Data

Nov. 21, 2017  (TW) .............................. 106140394 A

(51) Int. Cl.
*H04L 12/54*  (2013.01)
*H04L 29/06*  (2006.01)
(Continued)

(52) U.S. Cl.
CPC ............ *H04L 12/56* (2013.01); *H04L 9/0637* (2013.01); *H04L 12/1854* (2013.01);
(Continued)

(58) Field of Classification Search
CPC . H04L 12/1854; H04L 12/1881; H04L 12/56; H04L 2209/38; H04L 2209/805;
(Continued)

(56) References Cited

U.S. PATENT DOCUMENTS 9,553,982 B2    1/2017  Unitt
10,356,066 B2*  7/2019  Ateniese ............... H04L 63/062
(Continued)

FOREIGN PATENT DOCUMENTS

CN    106465174 A    2/2017
CN    106936818 A    7/2017
TW       518497 B    1/2003

OTHER PUBLICATIONS

Chi Cheng, Jemin Lee, Tao Jiang, Tsuyoshi Takagi; Security Analysis and Improvements on Two Homomorphic Authentication Schemes for Network Coding; IEEE Transactions on Information Forensics and Security, vol. 11, No. 5, May 2016.
(Continued)

*Primary Examiner* — Minh Trang T Nguyen
(74) *Attorney, Agent, or Firm* — Rosenberg, Klein & Lee

(57) ABSTRACT

The present invention provides a method for high-security data transmission of a blockchain. First, a source node device broadcasts a data packet to at least one destination node device and at least two cooperative node devices in the blockchain. The data packet includes a random variable and a transmission data. The cooperative node devices further forward the data packet to the destination node device. When the number of data packets received by the destination node device is equal to the random variable, the cooperative node device sends a report signal to the source node device, and the source node device broadcasts a stop broadcasting request to the blockchain, then the other node devices stop forwarding data packets to the destination node device, and finally the destination node device compares the transmission data of the data packet and selects the data packet with the same transmission data packet to store.

7 Claims, 6 Drawing Sheets

(51) Int. Cl.
   *H04L 12/18*  (2006.01)
   *H04L 12/761* (2013.01)
   *H04L 9/06*   (2006.01)
   *H04L 29/08*  (2006.01)
(52) U.S. Cl.
   CPC .......... *H04L 12/1881* (2013.01); *H04L 45/16* (2013.01); *H04L 63/123* (2013.01); *H04L 67/28* (2013.01)
(58) Field of Classification Search
   CPC ......... H04L 45/16; H04L 63/04; H04L 63/12; H04L 63/123; H04L 67/10; H04L 67/28; H04L 9/0637; H04L 9/3239
   See application file for complete search history.

(56) References Cited

U.S. PATENT DOCUMENTS

| | | | | |
|---|---|---|---|---|
| 2008/0247355 | A1* | 10/2008 | Ahn | H04L 45/18 370/328 |
| 2012/0163199 | A1* | 6/2012 | Marbach | H04W 28/02 370/252 |
| 2015/0026072 | A1 | 1/2015 | Zhou et al. | |
| 2016/0283920 | A1 | 9/2016 | Fisher et al. | |
| 2017/0103468 | A1 | 4/2017 | Orsini et al. | |
| 2018/0248845 | A1* | 8/2018 | Irwan | H04L 9/3239 |
| 2019/0058580 | A1* | 2/2019 | Tormasov | H04L 9/0637 |

OTHER PUBLICATIONS

Tiffany Hyun-Jin Kim, Lin-Shung Huang, Adrian Perrig, Collin Jackson, Virgil Gligor; Accountable Key Infrastructure (AKI): A Proposal for a Public-Key Validation Infrastructure; International World Wide Web Conference Committee (IW3C2), May 13-17, 2013.

David Basin, Cas Cremers, Tiffany Hyun-Jin Kim, Adrian Perrig, Ralf Sasse, Pawel Szalachowski; Design, Analysis, and Implementation of ARPKI: an Attack-Resilient Public-Key Infrastructure; IEEE, 1545-5971.

Search Report Issued by a Foreign Patent Office in Application No. 10720671540.

* cited by examiner

METHOD FOR HIGH-SECURITY DATA TRANSMISSION OF BLOCKCHAIN

This application claims priority for Taiwan patent application no. 106140394 filed on Nov. 21, 2017, the content of which is incorporated by reference in its entirety.

BACKGROUND OF THE INVENTION

Field of the Invention

The present invention relates to a digital information transmission technology, particularly to a method for high-security data transmission of a blockchain.

Description of the Related Art

The Internet of Things (IoT) is an information carrier of the Internet, the traditional telecommunication networks, etc., enabling ordinary objects to interconnect with each other. IoT features decentralization and requires a mechanism to verify data integrity. The authentication power in IoT is not dominated by a single authentication center but distributed to many different node devices.

For a network having a huge number of node devices, multitudinous requests to connect with a single authentication center for verifying data integrity would cause network clogging and seriously delay the system.

The problem of data-transmission security in source-sharing of IoT, i.e., the data security mechanism, is a very important topic in IoT. Therefore, the blockchain technology, which is originally designed for the node-to-node network of the virtual digital money, has been gradually introduced into the field of IoT.

Although the blockchain technology achieves a wonderful success in the field of finance, it still has many limitations in the application to IoT. For example, the blockchain technology demands that all the node devices in the networks must participate in the whole authentication process, and each node device would spend a vast amount of computing capacity in authentication. The data in IoT is more complicated and bulky than in the financial field. It is impractical to directly apply the blockchain technology to process the data in the node devices of IoT.

Accordingly, the present invention proposes a method for high-security data transmission of a blockchain to overcome the abovementioned problems.

SUMMARY OF THE INVENTION

The primary objective of the present invention is to provide a method for high-security data transmission of a blockchain, which uses a random variable to specify the number of cooperative node devices and specifies the cooperative node devices randomly, whereby the cooperative node devices of the present invention have high uncertainty, and whereby the attackers are hard to know the number and positions of cooperative node devices, wherefore the present invention can prevent the attackers from finding the positions of attack and effectively enhance the security of the system.

Another objective of the present invention is to provide a method for high-security data transmission of a blockchain, which does not demand all the node devices of the blockchain to participate in the whole authentication process and effectively reduces the amount of data processed by the node devices of the blockchain, wherefore the present invention is favorable for processing a vast amount of data and very useful in IoT.

In order to achieve the abovementioned objectives, the present invention proposes a method for high-security data transmission of a blockchain, which comprises steps: a source node device broadcasting a data packet to at least one destination node device in the blockchain, wherein the data packet has a random variable and a transmission data; at least two cooperative node devices receiving the broadcasted data packet and further respectively forwarding the data packet to the destination node device to make the destination node device receive the data packet once again; while the number of the data packets, which are transmitted by the source node device and the cooperative node devices respectively and received by the destination node device, is equal to the random variable, the destination node device sending a report signal to the source node device to enable the source node device to broadcast a stop broadcasting request to the blockchain to make the other node devices stop forwarding the data packet to the destination node device; the destination node device comparing the plurality of transmission data of the data packets, selecting the data packet having the maximal number of identical transmission data as the correct data packet, and storing the correct data packet.

The cooperative node devices are the node devices broadcasting the data packets to the destination node device in priority among the plurality of the node devices in the blockchain.

Below, embodiments are described in detail to make easily understood the objectives, technical contents, characteristics and accomplishments of the present invention.

DETAILED DESCRIPTION OF THE INVENTION

Figure 1:
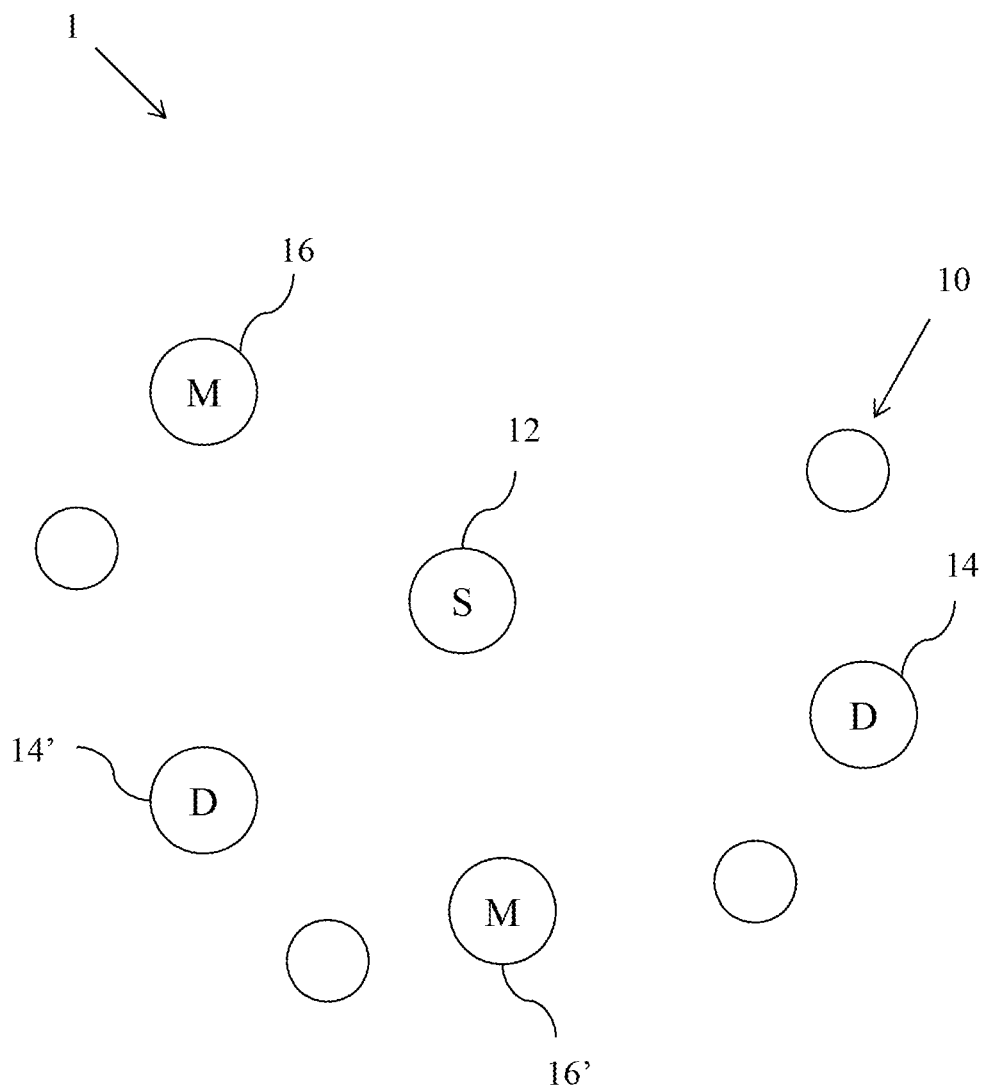
FIG. 1 is a diagram schematically showing the blockchain structure by means of applying the method of the present invention.

The present invention discloses a method for high-security data transmission, which is applied to blockchains. Refer to FIG. 1 for the blockchain structure by means of applying the method of the present invention. In this embodiment, the blockchain 1 includes a plurality of node devices 10 interconnecting with each other. The node devices 10 are respectively provided by different computers (not shown in the drawing). A source node device 12, destination node devices 14 and 14', and cooperative node devices 16 and 16' are defined from the node devices 10. The source node device 12 is the node device 10 sending out data. The destination node devices 14 and 14' are the node devices 10 the data are sent to. The cooperative node devices 16 and 16' are the node devices 10 further forwarding the same data to the destination node devices 14 and 14' for data comparison.

Figure 2:
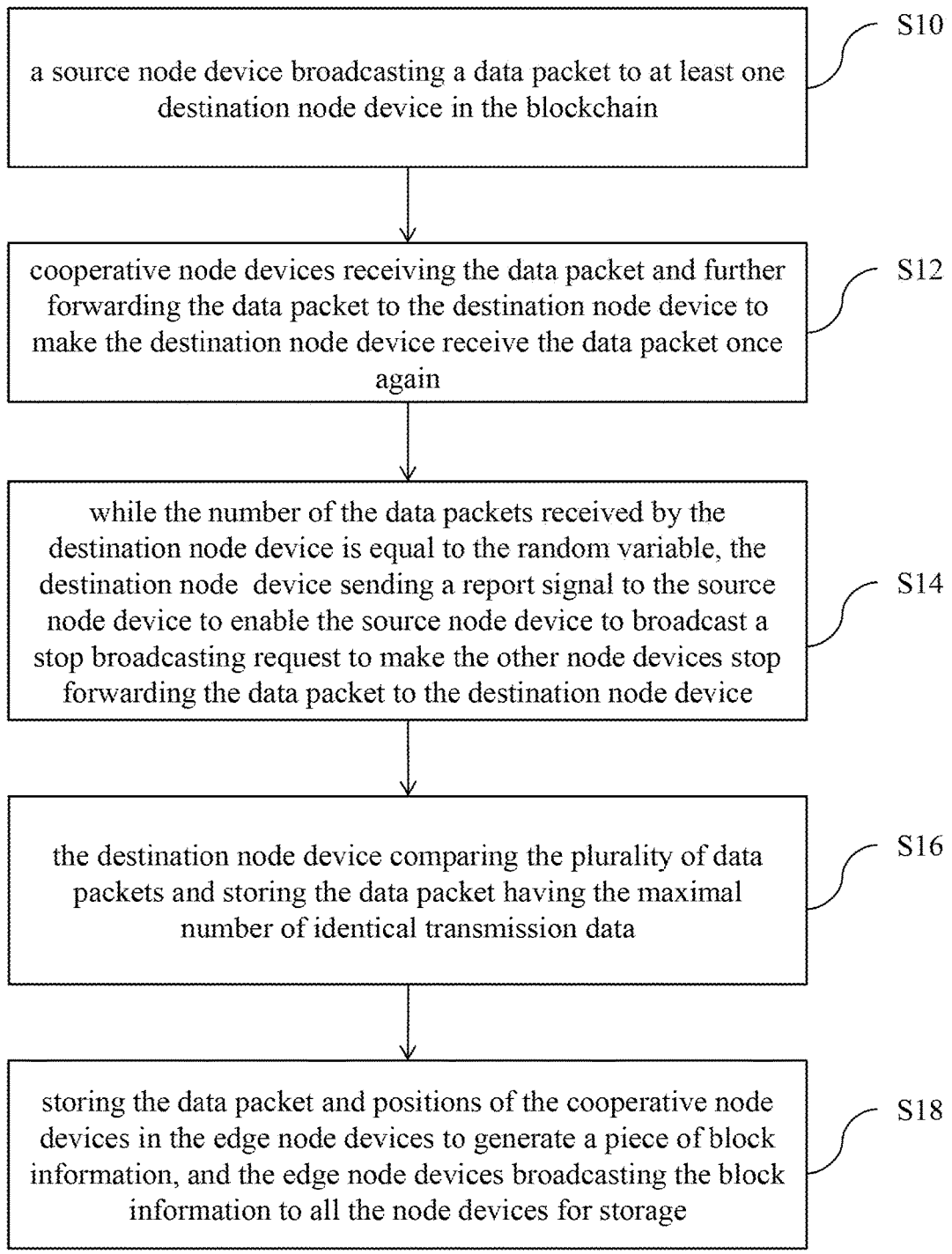
FIG. 2 is a flowchart of a method for high-security data transmission of a blockchain according to one embodiment of the present invention.
Figure 3:
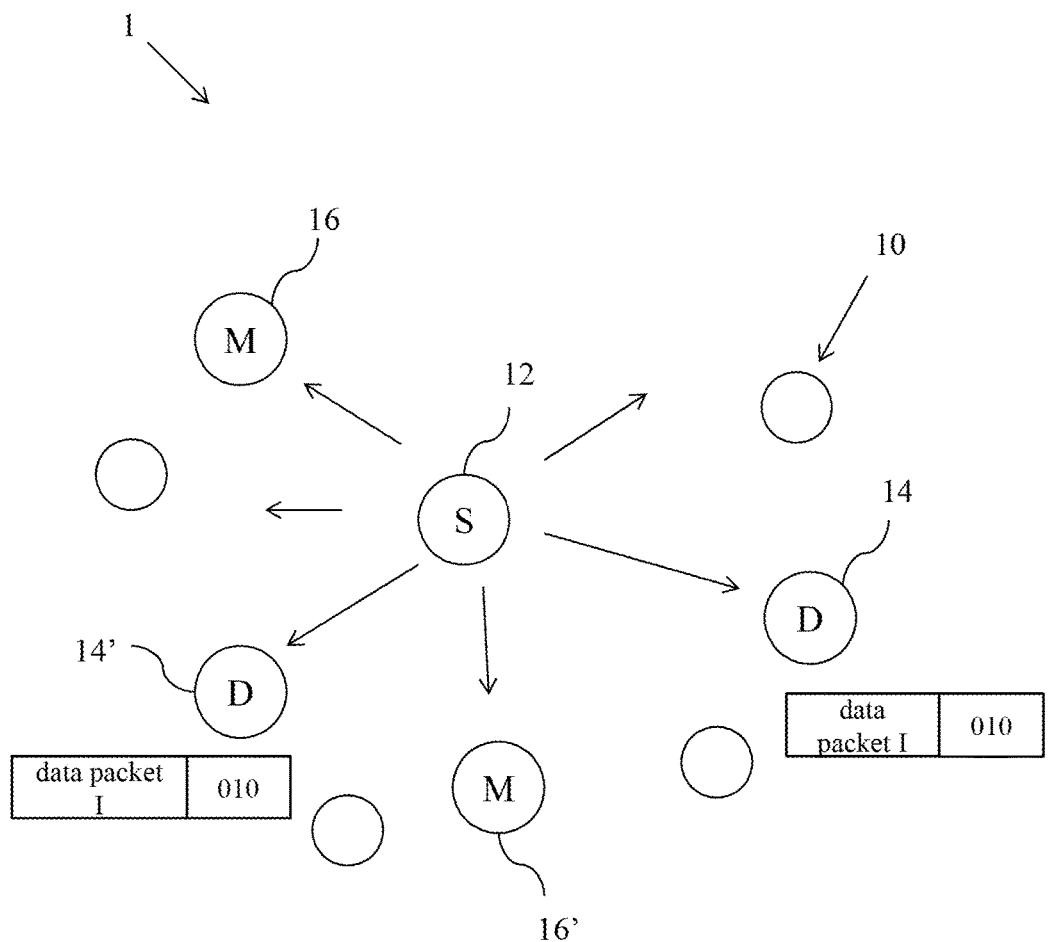
FIGS. 3-6 are diagrams schematically showing steps of a method for high-security data transmission of a blockchain according to one embodiment of the present invention.

The structure of the system, which the method of the present invention applies to, has been described above. The steps of the method for high-security data transmission of a blockchain of the present invention will be described below. Refer to FIGS. 2-6. As shown in FIG. 2 and FIG. 3, in Step S10, a source node device 12 broadcasts a data packet I to a blockchain 1, and two destination node devices 14 and 14' in the blockchain 1 receive the data block packet I. The data packet includes a random variable and a transmission data. The random variable is an odd number equal to or greater than 3. In this embodiment, 3 is used as the random variable. The transmission data is in form of binary codes, such as 010.

Figure 4:
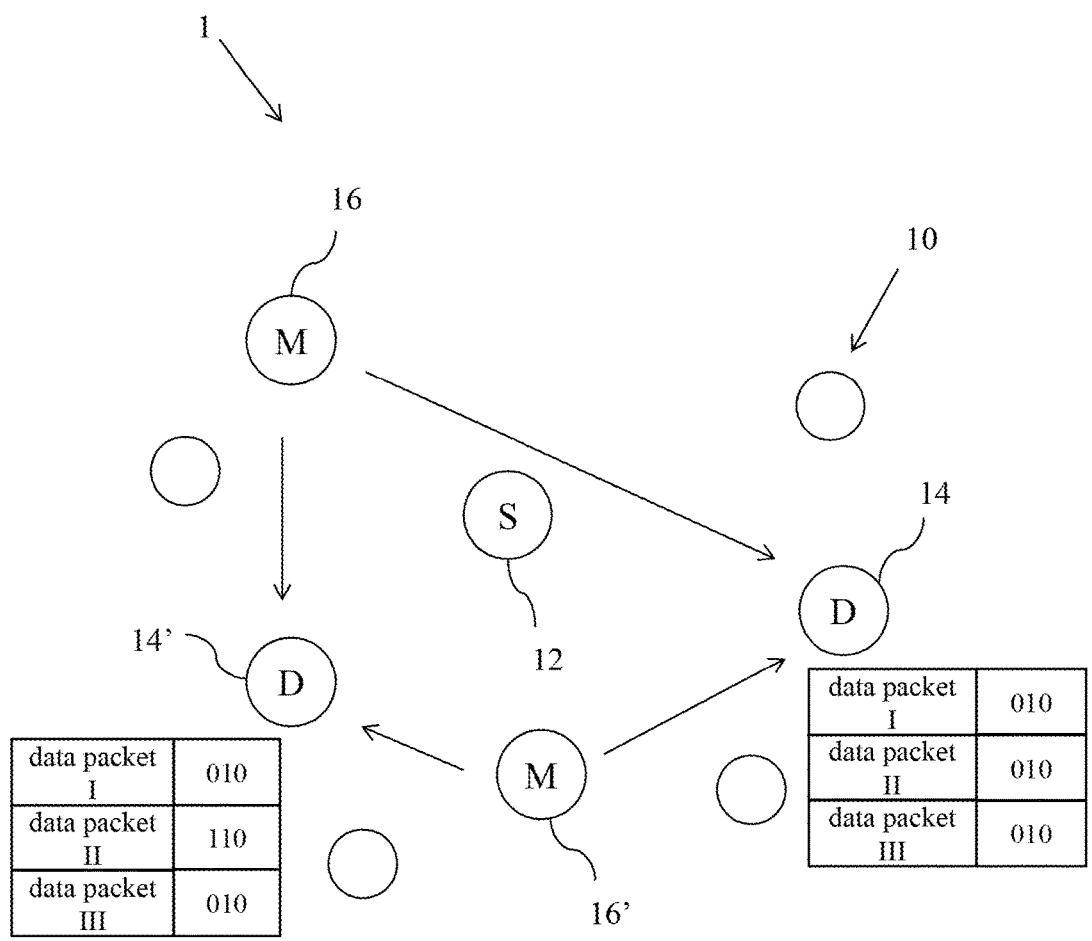

Next, the process proceeds to Step S12. As shown in FIG. 2 and FIG. 4, in Step S12, the data packet I broadcasted by the source node device 12 is also received by at least two cooperative node devices 16 and 16', and the cooperative node devices 16 and 16' further forward the data packet to the destination node devices 14 and 14', whereby the destination node devices 14 and 14' receive a data packet II and a data packet III, which are identical to each other. In one embodiment, the source node device 12 directly assigns the node devices 10 having higher computing capacity as the cooperative node devices 16 and 16' according to a user's operating signal. In one embodiment, the node devices 10, which broadcast the data packets to the destination node devices 14 and 14' in priority, are used as the cooperative node devices 16 and 16'. In detail, while source node device 12 broadcasts a data packet to the blockchain 1, the data packet is also transferred to the other node devices 10 in the blockchain 1 in addition to the destination node devices 14 and 14'. The other node devices 10 receiving the data packet further forward the data packet to the destination node devices 14 and 14'. Thus, the destination node devices 14 and 14' receive the data packets once again. While the destination node device 14 or 14' receives a data packet from one node device 10 in the blockchain 1, the destination node device 14 or 14' informs the source node device 12 of the fact. Then, the node device 10 is formally regarded as a cooperative node device 16 or 16'.

After the cooperative node devices 16 and 16' respectively have forwarded the data packets to the destination node devices 14 and 14', the process proceeds to Step S14. Refer to FIG. 4 again. In Step S14, while the number of the plurality of data packets received by the destination node device 14 or 14' from the source node device 12 and the cooperative node devices 16 and 16' is equal to the random variable, the destination node device 14 or 14' sends a report signal to the source node device 12. In this embodiment, the random variable is 3. While the destination node device 14 or 14' receives the data packet I from the source node device 12 and the earliest two data packets—the data packet II and the data packet III—from the cooperative node devices 16 and 16', the destination node device 14 or 14' sends a report signal to the source node device 12. While receiving the report signal, the source node device 12 broadcasts a stop broadcasting request to the blockchain 1 to make the other node devices 10, which have not yet started to transmit data packets, terminate forwarding data packets to the destination node devices 14 and 14'.

In the embodiment that the node devices 10 sending the data packets to the destination node device 14 or 14' in priority are assigned as the cooperative node devices 16 and 16'. Which ones of the node devices 10 will function as the cooperative node devices 16 and 16' is determined by multiple factors. For example, the factors: whether the node device 10 is in an idle state while receiving the data packet; whether the communication between the node device 10 and the destination node device 14 or 14' is smooth while the node devices 10 forwarding the data packet, and whether signals collide while the node device 10 forwards the data packet to the destination node device 14 or 14' will affect the speed at which the destination node device 14 or 14' receives the data packet forwarded by the node device 10. Thus is increased the randomness of determining the cooperative node devices 16 and 16'. In this embodiment, the number of the data packets transferred to the destination node device 14 or 14' is specified by a random variable. Thus is increased the uncertainty of the number and positions of the cooperative node devices 16 and 16'. Therefore, the attackers are hard to determine which node devices 10 are assigned to function as the cooperative node devices 16 and 16' in every authentication process.

Figure 5:
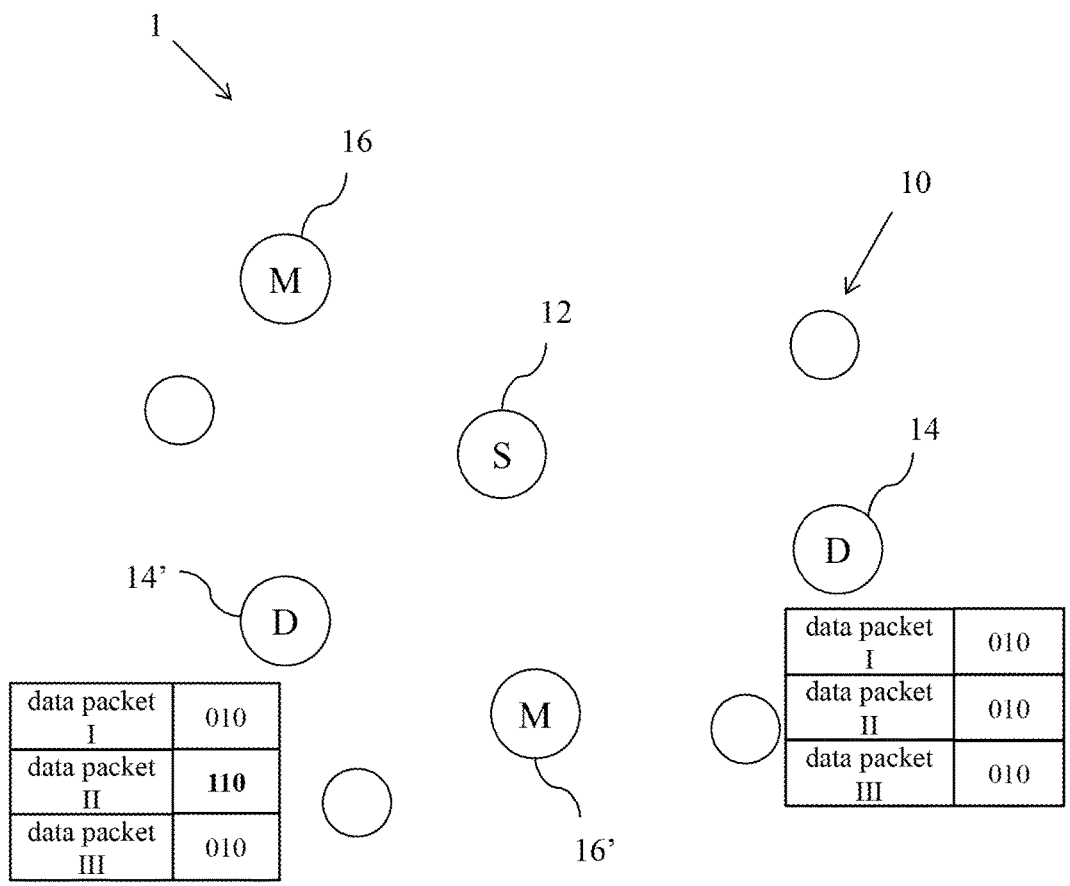

Next, the process proceeds to Step S16. Refer to FIG. 5. While the number of the data packets received by destination node device 14 or 14' is equal to the random variable, the destination node device 14 or 14' compares the transmission data of the received data packet I, data packet II and data packet III, selects the data packet having the maximal number of identical transmission data as the correct data packet, and stores the correct data packet. As shown in FIG. 5, the transmission data in the data packet I, data packet II and data packet III received by the destination node device 14 are all 010. The data packets having the maximal number of identical transmission data are determined by the majority rule. Therefore, the data packet containing 010 is correct, and the destination node device 14 stores the data packet containing 010. For the destination node device 14', the transmission data of the data packet II is 110; the transmission data of the data packet I and data packet III is 010. According to the majority rule, the data packet containing 010 is the correct data packet. Therefore, the destination node device 14' stores the data packet containing 010. The transmission data 110 of the data packet II is not a correct transmission data but may be data manipulated by the attacker. Therefore, the transmission data 110 would not be stored. Once the transmission data of the received data packet I, data packet II and data packet III are different, a node device is selected randomly as the correct data packet and stored.

Figure 6:
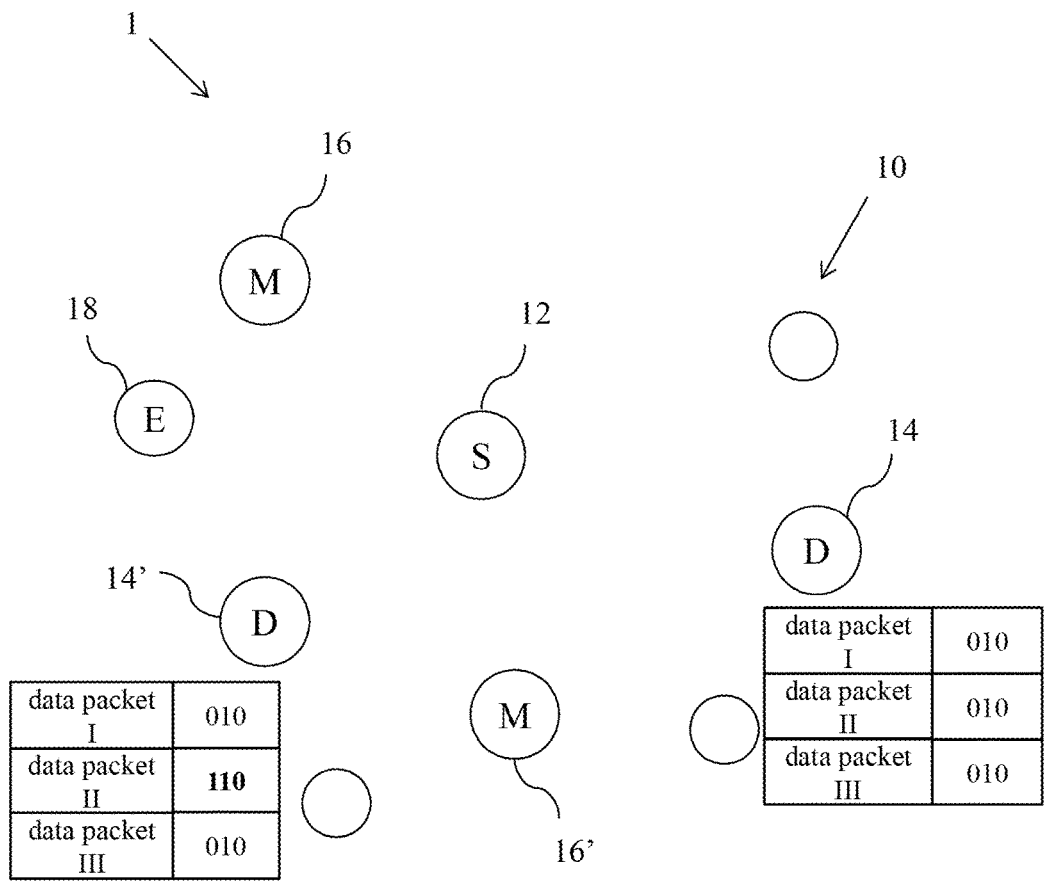

Then, the process proceeds to Step S18. Refer to FIG. 6. After one data packet has been verified to be a correct data packet, the destination node devices 14 and 14' store the correct data packet. The source node device 12 may further search all the node devices 10 in the blockchain 1 except the destination node devices 14 and 14' and the cooperative node devices 16 and 16' to make the node devices 10 having high computation capacity function as edge node devices 18. The source node device 12 may store the data packet and the positions of the cooperative node devices 16 and 16' in the edge node devices 18 to enable the edge node devices 18 to generate a piece of block information. The edge node devices 18 further broadcasts the block information to all the node devices 10 for storage. In one embodiment, one node device 10 having high computation capacity in the blockchain 1 is directly assigned as an edge node device 18 according to a user's operating signal. Naturally, the edge node device 18 is provided by a high-computation capacity computer.

The method of the present invention is applicable to a blockchain having a huge number of node devices. The more the node devices of the blockchain, the higher the security of the blockchain. For example, while a blockchain has 3000 node devices but the total number of the source node device and the cooperative node devices thereof is only 3, the attackers are hard to find out the source node device and the cooperative node devices from 3000 node devices. Thus is increased the defense rate and enhanced the security. In the present invention, only a portion of the node devices in the blockchain participate in the whole authentication process. Therefore, the present invention can decrease the number of the node devices used to process data and reduce the consumption of computation source. The present invention uses node devices having higher capacity to process complicated data and performs effectively in IoT.

In conclusion, the present invention randomly specifies the number of the cooperative node devices and also randomly specify the cooperative node devices to make the attackers hard to find the positions of the cooperative node devices. In the present invention, the cooperative node devices have high uncertainty, exempted from being found by the attackers according to logics. Therefore, the present invention can enhance the security of the system. In the present invention, not all the node devices of the blockchain participate in the whole authentication process. Thus, the present invention can decrease the node devices used to process complicated data. Hence, the present invention favors processing massive data and works effectively in IoT.

The embodiments described above are only to exemplify the present invention but not to limit the scope of the present invention. Any equivalent modification or variation according to the characteristic or spirit of the present invention is to be also included by the scope of the present invention.

What is claimed is:

1. A method for high-security data transmission of a blockchain, comprising:
   a source node device broadcasting a data packet to at least one destination node device, wherein said data packet has a random variable and a piece of transmission data;
   at least two cooperative node devices in said blockchain receiving said data packet broadcasted and further forwarding said data packet to said destination node device to make said destination node device receive said data packet once again;
   while a number of said data packets, which are transmitted by said source node device and said cooperative node devices and received by said destination node device, is equal to said random variable, said destination node device sending a report signal to said source node device to enable said source node device to broadcast a stop broadcasting request to said blockchain to make other node devices in said blockchain stop forwarding said data packet to said destination node device;
   said destination node device comparing said transmission data of said data packets, selecting one said data packet having a maximal number of identical said transmission data as a correct data packet, and storing said correct data packet; and
   said source node device searching all said node devices in said blockchain to make node devices having high computation capacity function as edge node devices; storing said data packet and positions of said cooperative node devices in said edge node devices to generate a piece of block information; and said edge node devices broadcasting said block information to all said node devices for storage.

2. The method for high-security data transmission of a blockchain according to claim 1, wherein said cooperative node devices are node devices in said blockchain, which broadcast said data packets to said destination node device in priority.

3. The method for high-security data transmission of a blockchain according to claim 1, wherein said source node device directly assigns at least one said node device in said blockchain as said cooperative node device according to a user's operating signal.

4. The method for high-security data transmission of a blockchain according to claim 1, wherein said random variable is equal to or greater than 3.

5. The method for high-security data transmission of a blockchain according to claim 1, wherein said edge node device is provided by a computer.

6. The method for high-security data transmission of a blockchain according to claim 1, wherein said source node device directly assigns at least one said node device in said blockchain as said edge node device according to a user's operating signal.

7. The method for high-security data transmission of a blockchain according to claim 1, wherein said node devices are respectively provided by a plurality of computers.

* * * * *